W. E. MERRYMAN.
NUT LOCK.
APPLICATION FILED DEC. 23, 1921.
1,434,558.
Patented Nov. 7, 1922.
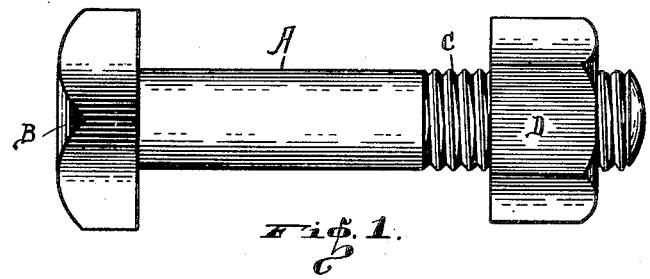
Fig. 1.
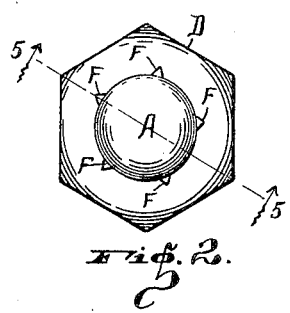
Fig. 2.
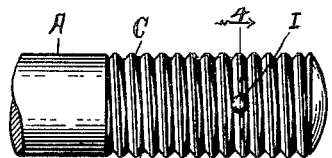
Fig. 3.
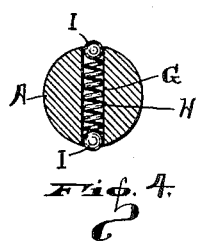
Fig. 4.
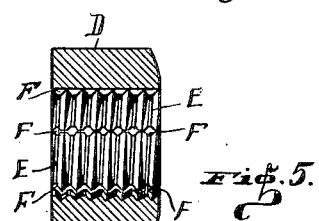
Fig. 5.
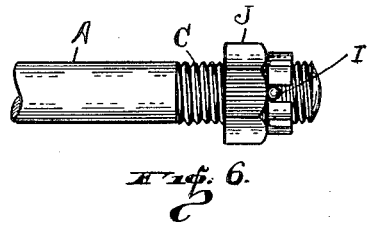
Fig. 6.
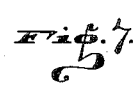
Fig. 7.
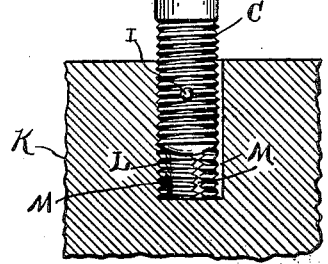
Inventor:
W. E. Merryman;
By Robert W. Randle
Attorney.

Patented Nov. 7, 1922.

1,434,558

UNITED STATES PATENT OFFICE.

WILLIAM ESTEL MERRYMAN, OF RICHMOND, INDIANA.

NUT LOCK.

Application filed December 23, 1921. Serial No. 524,530.

*To all whom it may concern:*

Be it known that I, WILLIAM ESTEL MERRYMAN, a citizen of the United States, residing in the city of Richmond, in the county of Wayne, State of Indiana, have invented certain new and useful Improvements in Nut Locks, of which the following is a full, clear, and comprehensive specification and exposition, the same being such as will enable others to make and use the same with exactitude.

The object of my present invention, broadly speaking, is to provide a nut or bolt locking construction which is strong and durable in construction, simple in character, positive in action, easy of manual operation, and which can be manufactured and sold at a comparatively low price.

More specifically stated, my object is to provide nut or bolt locking means which will not injure or disfigure the threads or other parts of the bolt or nut with which it is employed, in which the nut will not inadvertently back off of the bolt, and which will not jar loose by reason of vibration, yet being such as will permit the nut to be turned back by means of a wrench.

Other special objects and particular advantages of the invention will suggest themselves in the course of the following description, and that which is new will be correlated in the claim.

The preferred means for carrying out my invention in a practical manner is shown in the accompanying drawings, in which—Figure 1 is a side elevation of a bolt and nut with my invention as incorporated. Figure 2 is an outer end elevation of the bolt and nut shown in Fig. 1. Figure 3 shows the threaded portion of a bolt without the nut, and showing a portion of the invention in connection therewith. Figure 4 is a cross section as taken on the line 4—4 of Fig. 3. Figure 5 is a cross section of the nut alone, as taken on the line 5—5 of Fig. 2. Figure 6 is a side elevation in which is employed a castellated nut. And Figure 7 shows a tap bolt showing how same may be locked without the employment of a nut.

Similar indices denote like parts throughout the several views.

In order that the construction, the operation, and the advantages of my invention may be the better understood and appreciated I will now take up a detailed description thereof, in which I will set forth the invention as fully and as clearly as I may.

Referring now to the drawings in detail: Letter A denotes a bolt, having a head B integral with one end thereof, the other end portion of the bolt being provided with threads C as shown. Letter D denotes the nut which is interiorly threaded whereby it will run on the threads C in the usual manner, said threads being denoted by the letter E.

Formed in the interior wall of the nut, at substantially right angles to the threads E are channels F, preferably five in number, for the purpose hereinafter described.

Formed through the bolt A, at some point within the limits of the threads C, is an aperture G which is at right angles to the bolt and it extends centrally therethrough at right-angles thereto, as is clearly shown in Fig. 4.

Located in the aperture G is the comparatively strong helical spring H which is adapted to be contracted.

Neatly fitting the aperture G are the two balls I which contact with the respective ends of the spring H. Said balls are first pressed into the aperture G against the resiliency of the spring H, after which the outer edges of the aperture G is peened in or slightly contracted whereby the balls are prevented from coming entirely out of the aperture G but allowing a portion thereof to be exposed out beyond the periphery of the bolt, with said balls free to be pressed inward against the resiliency of the spring H.

In Figure 6 is shown a slight modification wherein a castellated nut J is employed in place of the nut D, which manifestly dispenses with the necessity of the channels F, as the space between the prongs of the nut J will answer in place thereof.

It is also to be understood that if a tap bolt with which no nut is employed it may be locked with my invention: In Figure 7 there is shown a body of metal K into which is formed a threaded aperture L into which may be run the threaded portion of the tap bolt. It is to be understood that channels M are formed, similar to the channels F, in which the balls I of the tap bolt may engage.

It will now be seen that with the nut and the bolt equipped with my invention, as shown in Figs. 2, 3, 4 and 5, that the nut D may be run on the bolt to the point desired, but as the nut is turned the balls I will revolve upon the inner face of the nut, but as they come opposite to each channel F the spring H will force the balls outward into said channels F, thereby locking the nut but not with sufficient rigidity as to prevent the nut being turned when extra power is applied to turn it. The extra power applied will be such as to cause the balls to climb the sides of the channels F and therefore forcing the balls into the aperture G against the expansive force of the spring H.

It should be noticed that if six of the channels F, equally spaced apart, were employed in each nut then in that event the balls would both be in channels F at the same time, thereby making only six stops or locking points, but by providing only five channels F it is evident that I provide ten stops or locking points and consequently making the adjustment finer, that is with less distance to turn the nut from one locking point to another.

Of course with the six locking points there are two balls in their respective channels each time which might at first glance be assumed would make a more secure lock, but this is offset by the fact that when only one ball locks at a time then the other ball will be forced entirely within the aperture G thereby applying greater pressure to the spring H and thereby pressing the one ball more firmly into contact with its channel F.

It is contemplated that ordinarily the nut D with the channels F will be employed. But should the nut D be mislaid when wanted then a stock nut, as the castellated nut J, may be substituted as it will give the same results in practice.

Attention is hereby called to these facts: The locking is entirely automatic, that is as soon as the nut is turned to its final position there is nothing more to be done by the operator; if the nut should be turned to a position where neither of the balls I is in a channel it is not necessary to move the nut forward or backward, as after being left in that position the nut can not turn inadvertently except to the next locking point; the invention does not disfigure or weaken the nut or bolt, and the nut may be removed and used over again and again without deterioration thereof; and the invention does not require any extra time for its manipulation either in placing it in position or in its removal.

I desire that it be understood that various changes may be made in the several details of construction without departing from the spirit of the invention and without sacrificing any of the advantages thereof which are new and useful and which involve invention.

Having now fully shown and described my invention, what I claim and desire to secure by Letters Patent of the United States, is—

In combination with a bolt and a nut threaded thereon, there being an aperture formed entirely through the threaded portion of the bolt at right angles thereto, a helical spring located in said aperture in the bolt, a ball located movably in each end of said aperture with said spring in contact with each ball and adapted to resiliently force the said balls apart and beyond the periphery of the bolt, means for preventing said balls from being forced entirely out of said aperture, there being an odd number of channels formed longitudinally of and in the interior wall of the nut and cutting the threads in the nut at substantially right angles and into which said balls are adapted to alternately engage in order to retard the rotation of the nut with relation to its bolt, no two of said channels being directly opposite to each other whereby but one of said balls can be engaged in a channel at one time, all substantially as shown and described.

In testimony whereof I have hereunto subscribed my name to this specification.

WILLIAM ESTEL MERRYMAN.